United States Patent [19]

Shoestock, Sr.

[11] Patent Number: 5,433,291

[45] Date of Patent: Jul. 18, 1995

[54] COMBINATION TREE STAND AND WHEELED GAME CARRIER

[76] Inventor: Richard F. Shoestock, Sr., Rte. 7, Box 598-A/Littlejohn Church Rd., Lenoir, N.C. 28645

[21] Appl. No.: 350,465

[22] Filed: Dec. 7, 1994

[51] Int. Cl.⁶ .............................................. A01M 31/02
[52] U.S. Cl. ...................... 182/20; 182/187; 182/136
[58] Field of Search ............... 182/187, 188, 133–136, 182/20, 116

[56] References Cited

U.S. PATENT DOCUMENTS

| | | |
|---|---|---|
| 3,960,240 | 6/1976 | Cotton .................................. 182/20 |
| 4,045,040 | 8/1977 | Fails . | 
| 4,321,983 | 3/1982 | Nelson ............................. 182/187 X |
| 4,331,216 | 5/1982 | Amacker ......................... 182/187 X |
| 4,417,645 | 11/1983 | Untz ................................ 182/187 X |
| 4,582,165 | 4/1986 | Latini ................................... 182/20 |
| 4,694,934 | 9/1987 | Erickson . |
| 5,143,176 | 9/1992 | Burdette . |
| 5,253,732 | 10/1993 | Daniels . |
| 5,282,520 | 2/1994 | Walker . |
| 5,295,556 | 3/1994 | Mullin . |
| 5,314,042 | 5/1994 | Adams . |

FOREIGN PATENT DOCUMENTS 9300907  1/1993  WIPO .................................. 182/187

*Primary Examiner*—Alvin C. Chin-Shue
*Attorney, Agent, or Firm*—Richard C. Litman

[57] ABSTRACT

A combination self-climbing tree stand and wheeled game carrier provides for carriage of a hunter's equipment into a relatively remote hunting site and carriage of game or other articles therefrom. The disposition of the relatively large wheels near the center of gravity of the device, enables a person to carry a substantial load with the wheels supporting nearly all of the weight. The configuration of the device may be changed relatively easily, by separating two major components and removing the wheels, whereupon the device may be reassembled about a tree or the like and used to lift the hunter and his/her equipment up the tree, without need for other supplemental lifting or hoisting devices. The seat disposed within the tree stand configuration may be arranged to face toward or away from the tree, and additional convenience and safety features may be provided, such as storage pockets, side rails, and a foot rest. Thus, a hunter needs only a single major piece of equipment besides his/her weapon, when using the present stand and game carrier.

20 Claims, 3 Drawing Sheets

COMBINATION TREE STAND AND WHEELED GAME CARRIER

FIELD OF THE INVENTION

The present invention relates generally to devices used in the sport of hunting relatively large game, and more specifically to a self climbing tree stand, i e., one in which the hunter or user may raise the stand up the tree while remaining in the stand, which stand may be quickly and easily modified to provide a wheeled cart or game tote providing for the carriage of articles to the hunting site and for the hauling of game out from the hunting site.

BACKGROUND OF THE INVENTION

Game hunting remains a popular sport and hobby for many persons, providing a generally enjoyable time in the outdoors for the hunter, and in addition providing the possibility of game for the table and/or for trophy purposes. Although some types of game (particularly deer) are actually increasing in population, hunting sites nevertheless are becoming fewer and more restricted. As a result, many, if not most, hunters are finding it necessary to trek farther and farther into the woods or other areas to find a suitable hunting site. Accordingly, carts or totes of various sorts have become increasingly popular with hunters.

In addition, the use of hunting sites in relatively heavily wooded areas, virtually necessitates the use of a tree stand in order for the hunter to (1) gain a good view of the surrounding area, and (2) remove him or herself from the normal, horizontal line of sight used by most game. Thus, a tree stand (preferably self-climbing, to obviate need for additional climbing equipment) is considered a necessity by many hunters.

The result of the above conditions and apparatus is that the typical hunter is overburdened with equipment needed for a hunt, particularly in those areas in which he/she must travel on foot for some distance to reach the selected hunting site. The hunting equipment industry has recognized this problem, and has responded by developing relatively light weight tree stands; however, such stands are not particularly durable, and accidents have occurred when such a lightweight stand fails structurally. In any event, the carriage of a tree stand, game carrier or tote, rifle and even a limited supply of ammunition, binoculars, food and beverage, etc. into a hunting site, will be seen to overburden even the stoutest of hunters, particularly in hilly terrain.

Thus, the need arises for a combination self climbing tree stand and game tote or carrier, which device combines the features of both such specific devices into a single article, thus saving weight and bulk and providing for ease of carriage and transport of equipment for the hunter using the device. Easily removable and installable wheels may also be provided for the present combination tree stand and game carrier, in order to provide further ease of use in normal terrain. The combination stand and carrier must be easily convertible from one configuration to the other and back to the original configuration, without need for additional tools and equipment. Furthermore, the tree stand configuration must be durable and sturdy, in order to preclude structural failure and accidents arising from such failure. The capability of wheeling the apparatus to and from the hunting site allows the device to be constructed in a relatively robust and durable manner, as ease of transport is provided by the wheels and the combination device precludes duplication of equipment, weight and bulk.

DESCRIPTION OF THE PRIOR ART

U.S. Pat. No. 4,045,040 issued to Hershell W. Fails on Aug. 30, 1977 discloses a Deer Stand And Game Carrier comprising a telescoping ladder, one end of which is supported by a wheel for transport and the other end of which is supported by a back pack worn by the hunter. The device is self supporting, rather than using a tree, and hence by definition cannot be self-climbing. As at least a portion of the device is on the ground and essentially in the horizontal line of sight of animals in the area, such animals would likely shy from the appearance and odors of the device, whereas the present invention is entirely supported above ground. Game may be secured to the Fails ladder portion for removal from the hunting site, but essentially half the weight of the game (and remaining structure) must be supported by the back pack portion worn by the hunter. The present invention uses a tree for self-climbing capability, and the weight of the cart (and anything carried thereon) is entirely supported by the wheels.

U.S. Pat. No. 4,694,934 issued to Curtis W. Erickson on Sep. 22, 1987 discloses a Portable Elevating Device which requires support by a non-vertical overhanging structure (e. g., tree limb, etc.) for climbing operation. The user must crank a winch to elevate him or herself upward along a rope or cable which has previously been tossed over an overhanging branch or the like. The entire device is relatively light in weight, including a plurality of various straps, belts, ropes, and cables, thus providing for carriage on the back of a hunter or the like. However, due to the light weight of the device and its specialized purpose strictly for use as a tree stand, it cannot be used for game carriage, as provided by the present invention.

U.S. Pat. No. 5,143,176 issued to Bryan A. Burdette on Sep. 1, 1992 discloses a Climbing Tree Stand which is sufficiently lightweight as to be capable of carriage on the back of a hunter or the like, and accordingly no wheels are disclosed. The device cannot be adapted or configured for the carriage of other articles thereon, as can the present invention. Again, the Burdette device is extremely lightweight for ease of carriage entirely on the person, and as a result numerous features and durability appear to be compromised.

U.S. Pat. No. 5,253,732 issued to Danny R. Daniels on Oct. 19, 1993 discloses a Portable Folding Tree Stand comprising a foldable, pole type ladder which upper end is braced against a tree or the like, while the opposite lower end rests upon the ground. Thus, the device is not self-climbing, as provided by the present invention and exemplified further by such devices as the Burdette device discussed immediately above. While Daniels provides a wheel for transport of the folded assembly, the wheel is disposed at one end of the device, which requires the person transporting the device to support essentially half the weight (or more, as shown in Daniels FIG. 3) at the opposite end. The carriage of heavy game would severely tax the strength or be beyond the capabilities of a person using the Daniels stand, as with the Fails device discussed further above.

U.S. Pat. No. 5,282,520 issued to Bret T. Walker on Feb. 1, 1994 discloses a Portable Hunting Stand And Game Carrier comprising a wheeled ladder. One end of the ladder remains on the ground, as with the Fails device discussed above, while the opposite end straps to a tree or the like. Again, the hunter must support essentially half the weight of the game and device.

U.S. Pat. No. 5,295,556 issued to Daniel J. Mullin on Mar. 22, 1994 discloses a Multipurpose Hunting Cart essentially comprising a hand truck type device. Frame members may be added or removed to reconfigure the device in a multitude of configurations, but ease of conversion is lost due to the relatively simple structure and the need to adapt numerous components when transferring from one configuration to another. (It is noted that virtually any type of device may be converted to another type of device, depending upon the amount of time and effort one wishes to undertake.) However, the Mullin device cannot be converted to a true tree stand, much less a self-climbing stand, as the bottom end of the ladder or frame portion is resting upon the ground when the device is used as a stand. The wheels are disposed near one end of the device, thus requiring a user to support a substantial portion of the load, as with the Fails, Daniels and Walker devices discussed above.

Finally, U.S. Pat. No. 5,314,042 issued to Joseph B. Adams on May 24, 1994 discloses a Tree Stand-Transport Vehicle essentially comprising a ladder which also serves as the vehicle frame. The ladder rests upon the surface when used as a tree stand, and is not self-climbing, as with the present invention. Moreover, the device must be braced at an intermediate point as well as at the top. The vehicle configuration requires four wheels, which adds considerably to the complexity, weight, and expense of the Adams stand and vehicle.

None of the above noted patents, taken either singly or in combination, are seen to disclose the specific arrangement of concepts disclosed by the present invention.

SUMMARY OF THE INVENTION

By the present invention, an improved combination tree stand and wheeled game carrier is disclosed.

Accordingly, one of the objects of the present invention is to provide an improved stand and carrier which essentially comprises two major portions, which portions are easily separated to form either a tree stand configuration or a game carrier configuration.

Another of the objects of the present invention is to provide an improved stand and carrier which stand configuration is self-climbing and requires no additional support from below or above.

Yet another of the objects of the present invention is to provide an improved stand and carrier which carrier configuration includes relatively large wheels disposed near the center of gravity of the carrier, with the wheels thus supporting nearly all of the weight of the carrier and any load carried thereon.

Still another of the objects of the present invention is to provide an improved stand and carrier which stand configuration includes a seat therein which may be secured to face either toward or away from the supporting tree, as desired.

A further object of the present invention is to provide an improved stand and carrier which tree stand configuration may include additional convenience and safety features, such as safety railing, storage pouch means, and/or a foot rest for the user of the stand.

A final object of the present invention is to provide an improved combination self-climbing tree stand and wheeled game carrier for the purposes described which is inexpensive, dependable and fully effective in accomplishing its intended purpose.

With these and other objects in view which will more readily appear as the nature of the invention is better understood, the invention consists in the novel combination and arrangement of parts hereinafter more fully described, illustrated and claimed with reference being made to the attached drawings.

BRIEF DESCRIPTION OF THE DRAWINGS

Similar reference characters denote corresponding features consistently throughout the several figures of the attached drawings.

DETAILED DESCRIPTION OF THE PREFERRED EMBODIMENT

Figure 1:
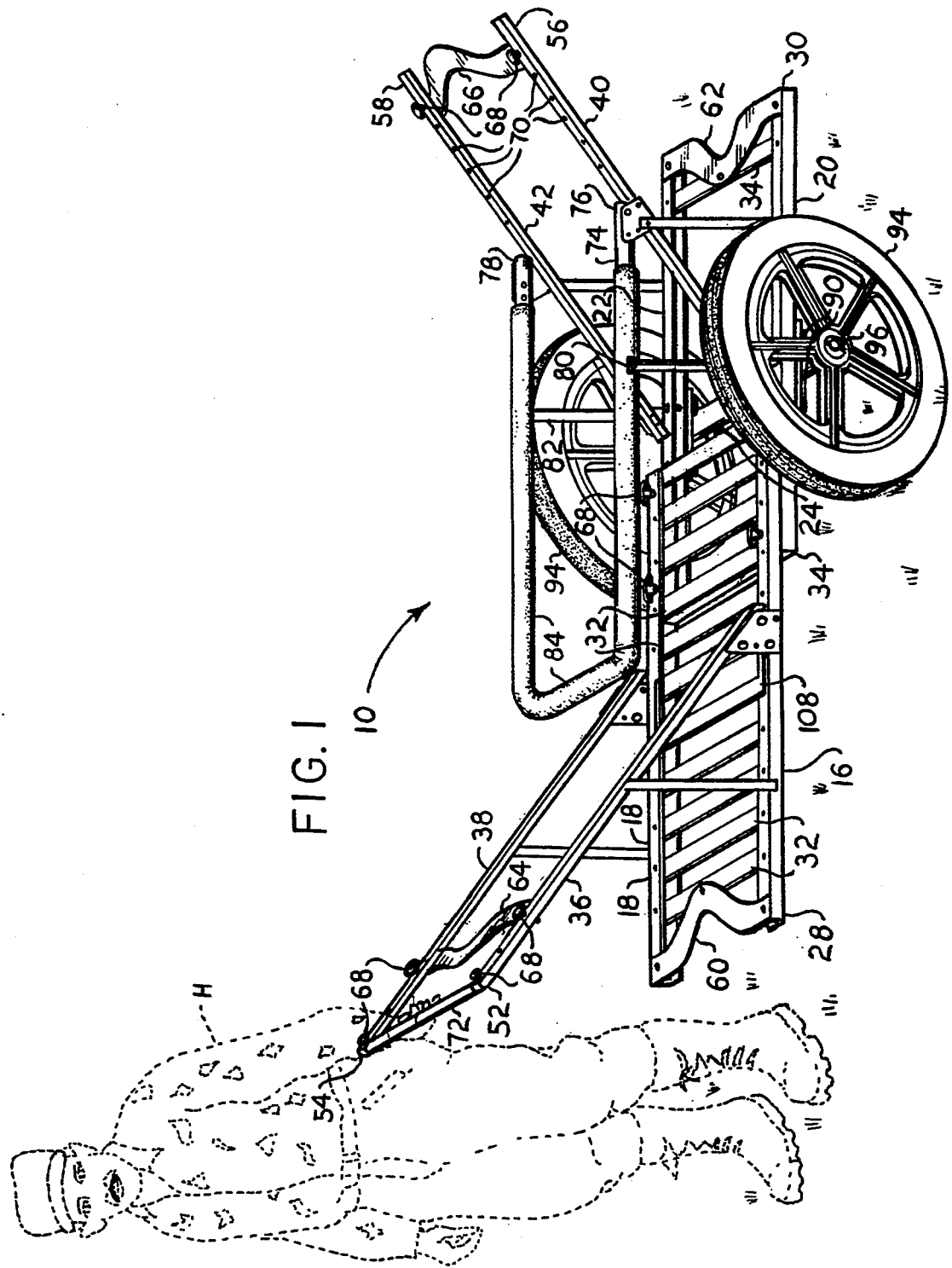
FIG. 1 is an environmental perspective view of the present invention in its game carrier mode, showing its use in transporting game or the like and other equipment from the hunting site.
Figure 3:
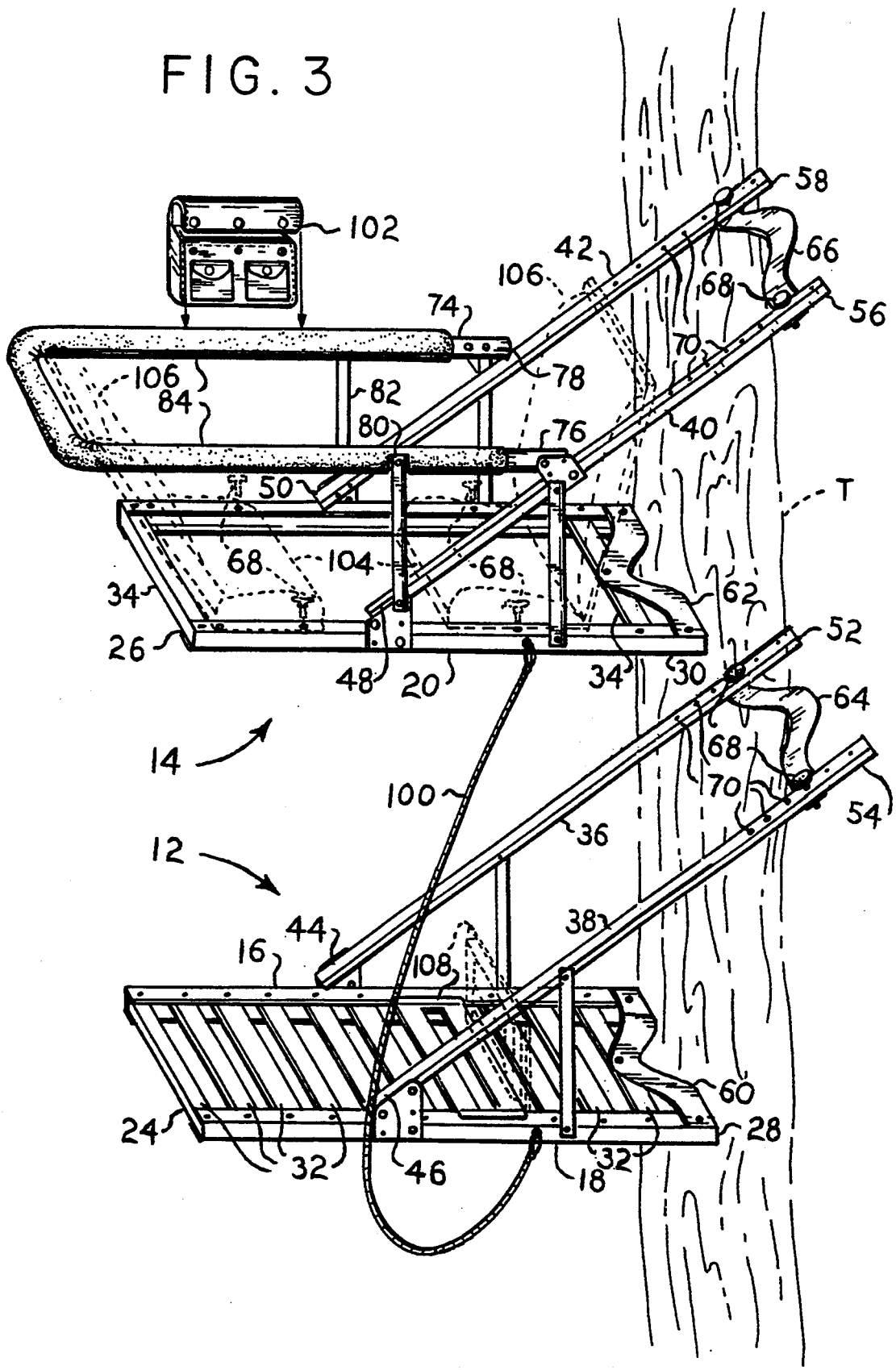
FIG. 3 is a perspective view of the present invention in its tree stand configuration, showing additional components used in the tree stand mode.

Referring now to the drawings, the present invention will be seen to relate to a combination tree stand and wheeled game carrier 10. FIG. 1 provides a view of the present stand/carrier 10 with the components assembled together to form a game tote or game carrier configuration, while FIG. 3 provides a view of the various components of the stand/carrier 10, disassembled and rearranged to provide a tree stand configuration.

Figure 2:
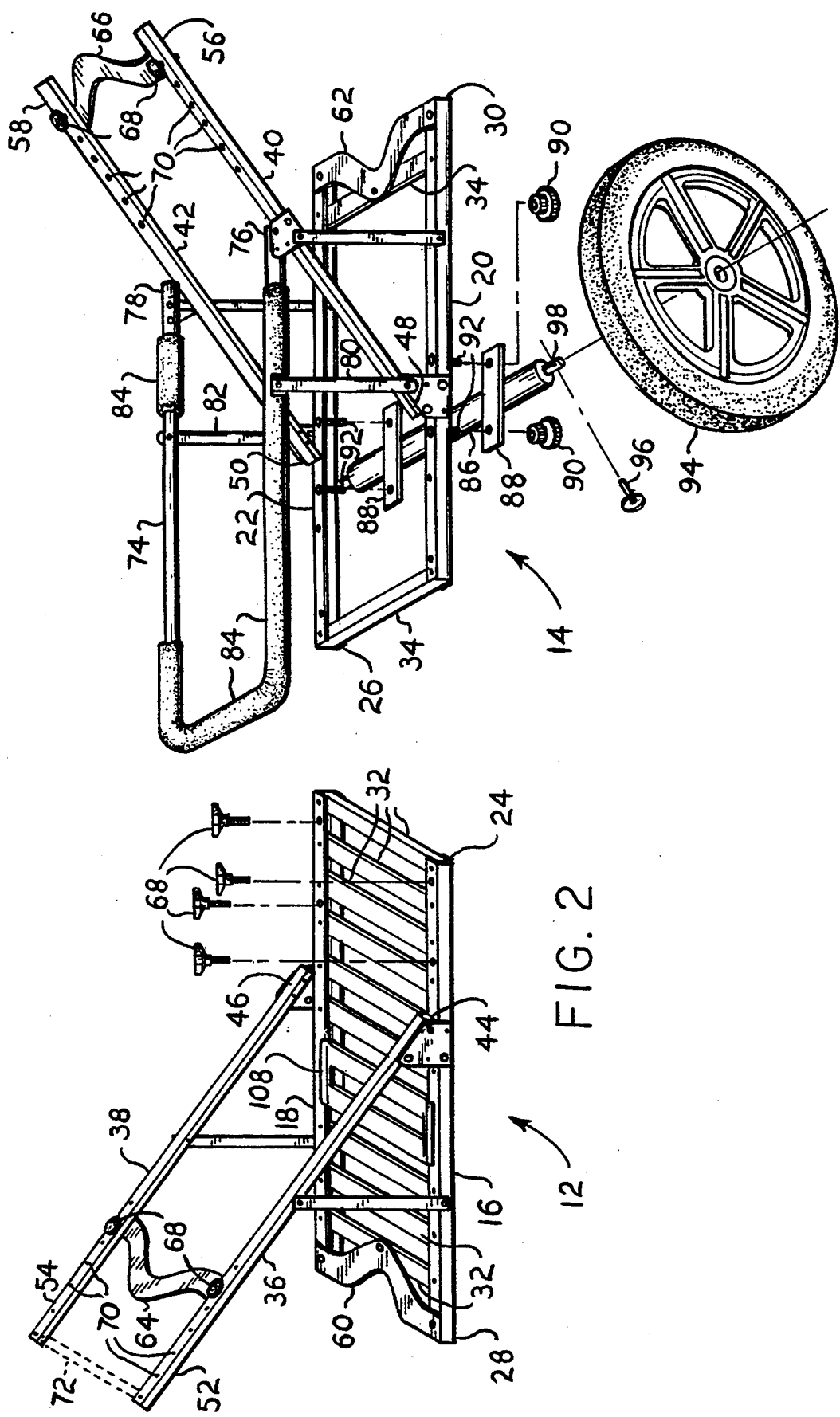
FIG. 2 is an exploded perspective view of the present invention, showing its disassembly from its game cart configuration and the relationship of the various components.

FIG. 2 provides an exploded view of the present stand/carrier 10, which figure will be referred to in the following discussion of the major components of the device. The present stand/carrier basically comprises a first frame portion 12 and a second frame portion 14, with each portion 12 and 14 including spaced apart and parallel first and second side members, respectively designated as 16 and 18 for the first frame portion and 20 and 22 for the second frame portion. Each of the frame portions 12 and 14 includes a first end, respectively designated 24 and 26, which first ends 24 and 26 secure together to provide the basic game carrier configuration shown in FIG. 1. The respective opposite second ends 28 and 30 of the first and second frame portions 12 and 14 provide for securing the device to a tree or similar object (e. g., pole or the like) when in the tree stand configuration of FIG. 3.

The first and second frame portions 12 and 14 further include several lateral crossmembers 32 and 34 respectively extending between the first and second side members 16 and 18 of the first frame portion 12, and the first and second side members 20 and 22 of the second frame portion 14, and serving to secure the respective first and second frame side members 16/18 and 20/22 together. At least one lateral crossmember 32/34 is located at the first end 24/26 and at the opposite second end 28/30 respectively of the first and second frame portions 12/14, and additional crossmembers 32 may be included in the first frame portion 12 to provide greater strength and/or support for articles placed thereon. The second frame portion 14 is preferably left open in the center thereof, in order to allow for use as the upper portion of a tree climbing stand, as described further below.

Each of the frame side members 16, 18, 20, and 22 has a diagonal frame member, respectively 36, 38, 40, and 42, extending upwardly from a generally medial point on the respective side member 16/18/20/22. Each of the diagonals 36/38/40/42 extends from a diagonal first end, respectively 44, 46, 48, and 50, upwardly and outwardly over and past the second ends 28 and 30 of the first and second frame portions 12 and 14, to terminate in a diagonal distal second end, respectively 52, 54, 56, and 58. The diagonal pairs for each frame portion 12/14, i. e., diagonal pairs 36/38 and 40/42, preferably have the same spacing therebetween as the respective frame side members 16/18 and 20/22, and thus the two diagonal members comprising a pair, i.e., diagonals 36 and 38 and diagonals 40 and 42, are parallel to one another.

The second ends 28 and 30 of the two frame portions 12 and 14 each respectively have a relatively lower tree engaging blade 60 and 62 secured respectively across the first frame portion 12 first and second side members 16 and 18, and across the second frame portion 14 first and second side members 20 and 22. The blades 60 and 62 are preferably further secured respectively to a first and second crossmember 32/34 adjacent the respective second ends 28/30 of the first and second frame portions 12 and 14, to provide additional strength to the respective frame portions 12/14 and rigidity to the respective blades 60 and 62. The distal second end pairs 52/54 and 56/58 respectively of the first frame portion 12 diagonals 36/38 and the second frame portion 14 diagonals 40/42 each have relatively higher and distal tree engaging blades 64 and 66 extending respectively therebetween.

The upper, distal blades 64/66 are removably installed between their respective diagonals 36/38 and 40/42, preferably by means of easily installable and removable fasteners such as the knobbed threaded fasteners 68 used throughout the present stand/carrier 10 for the assembly thereof. The removable installation of the upper, distal blades 64 and 66 allows at least one end of each blade 64/66 to be disconnected from the attached diagonal and pivoted to an open position, in order to be reinstalled about a tree or the like when the present invention is used in its tree stand configuration. It will be noted that the diagonals 36/38/40/42 each have a plurality of blade attachment points 70 therealong, in order to provide for the adjustability of the distal upper blades 64 and 66 for different diameters of trees or poles, as required.

Optionally, a lateral handle 72 may be removably installed between the second ends 52 and 54 of the diagonals 36 and 38, to provide for ease of maneuvering the present invention when in the game carrier configuration. The handle 72, if provided, may be installable by knobbed fasteners 68 (as shown in FIG. 1) for ease of removal, as required for conversion to tree stand configuration.

As the second frame portion 14 serves to hold the seating means for a person using the present stand/carrier 10 in its tree stand configuration, a generally U-shaped guard rail 74 is provided. The rail 74 comprises a bar (or hollow tubular member) with spaced apart opposite first and second ends 76 and 78, respectively secured to the first and second diagonals 40 and 42 of the second frame portion 14. First and second rail braces 80 and 82 serve to hold the rail substantially parallel to the second frame portion 14 side members 20 and 22. Padding 84 may be added to the rail 74 for greater comfort, if desired.

The second frame portion 14 also provides for the removable installation of wheels thereon. An axle 86 may be secured across the two side members 20 and 22, as close as possible to the first end 26 of the second frame portion 14 while still allowing space for the securing together of the two frame portions 12 and 14. Thus, the axle 86 will be positioned nearer the first end 26 than to the second end 30 of the second frame portion 14, in order to be located generally near the center of the assembled first and second frame portions 12 and 14, thereby to provide support for nearly all of the stand/carrier 10 and any contents thereof when assembled in the game carrier configuration. Two spaced apart plates 88 may be affixed to the axle 86, which plates 88 are in turn removably secured to the first and second side members 20 and 22 of the second frame portion 14 by means of internally threaded knobs or knobbed nuts 90 which mate with axle plate studs 92.

In addition to the removability of the axle 86 from the second frame portion 14, the wheels 94 are also removable from the ends of the axle 86. Quick release pins 96 pass through transverse holes or passages 98 in the ends of the axle 86, and serve to secure each of the wheels 94 (both are shown in FIG. 1) to the axle 86. Preferably, the wheels 94 are each of relatively large diameter, in order to provide for ease of movement over uneven terrain.

FIG. 1 provides a perspective view of the first and second frame portions 12 and 14, axle 86, and wheels 94 assembled together to form a wheeled game tote or game carrier configuration of the present combination stand/carrier 10. The relatively large diameter wheels 94, and their positioning as nearly as possible to the center of the carrier, provide for ease of maneuvering the carrier by a single hunter H or outdoorsman, as shown in FIG. 1.

The first ends 24 and 26 of the first and second frame portions 12 and 14 are secured together by means of knobbed fasteners 68, for ease of assembly and disassembly. The threaded studs of the fasteners 68 pass through mating passages in the first side members 16 and 20 and second side members 18 and 22 of the first and second frame portions 12 and 14, to secure the first side members 16 and 20 and the second side members 18 and 22 together in a parallel and overlapping configuration. The installation of the optional handle means 72 to the second ends 52 and 54 of the diagonals 36 and 38, provides for further ease of maneuvering the present stand/carrier 10 when in its wheeled game carrier configuration. The plurality of lateral members 32 in the first frame portion 12 provide a floor for the support of game, hunting weapons, equipment, food and beverage, etc. during the trek to and from the hunting site.

When the hunter H or outdoorsman arrives at the selected hunting or tree stand site, the game and equipment carrier configuration of the present combination stand/carrier 10 of figure 1, may be disassembled according to the discussion above of the components shown in FIG. 2. One of the two knobbed fasteners 68 securing the first frame portion upper blade 64 to the diagonal members 36/38 is removed, and the blade 64 is pivoted about the other fastener 68 to open the space between the two diagonals 36/38. The first frame portion 12 is then loosely secured to a tree T or the like by passing the two first frame portion 12 diagonal members 36 and 38 to opposite sides of the tree T, and securing the first frame upper blade 64 between the two diagonal members 36/38, to capture the tree T between the diagonals 36/38, the blade 64, and the first frame portion 12 lower blade 60.

The second frame portion 14 is secured to the tree T in a similar manner, above the first frame portion 12. The second frame portion 14 upper blade 66 is loosened and pivoted to an open position about one fastener 68, whereupon the second frame portion is loosely installed on the tree T and the blade 66 secured to both diagonals 40 and 42. The tree T is thus captured between the second frame portion diagonals 40 and 42, and the oppositely facing lower and upper blades 62 and 66, as shown in FIG. 3. A safety cable 100 may be used to secure the two frame portions 12 and 14 loosely together while in the self climbing tree stand configuration.

The hunter H or other person using the stand, may then secure any equipment and/or supplies he/she desires to have closely at hand, to the first/lower platform 12 and/or the second/upper platform 14; one or more storage containers 102 may be provided as desired, which container(s) 102 may be temporarily or permanently secured about the guard rail 74 and/or other components of the present stand/carrier 10, as desired. The hunter H then stands on the first/lower frame portion 12 and lateral members 32, with the upper portion of his/her body between the second/upper frame portion 14 side members 20 and 22 and within the guard rail 74. The tree stand may then be used to climb the tree T, by means of the hunter H alternatingly lifting the second/upper frame portion 14 by the guard rail 74 and/or side members 20/22 and locking the opposite second/upper frame portion 14 blades 62 and 66 against the tree T, then lifting the lower/first frame portion 12 to engage the tree T with the first frame portion 12 blades 60 and 64, and repeating the operation until the hunter reaches the desired height above the ground.

The present stand/carrier 10 provides additional features to ease the workload of the hunter H performing the above operation. A seat 104 and accompanying back rest 106 are removably installable across the upper/second frame portion 14 side members 20/22. Preferably, the seat portion 104 is secured to the upper/second frame portion 14 adjacent the first end 26 thereof, thus positioning the hunter or other person using the stand to face the tree T while seated. (It will be noted that the seat/back rest 104/106 are removably installable by means of knobbed fasteners 68, and may be installed adjacent the opposite, second end 30 of the second frame portion 14 if desired, to allow the hunter to face away from the tree T while seated after the stand has been lifted to the desired height and position for hunting.)

A person using the present stand lifts the lower/first portion 14 by lifting it with his/her feet while seated on the seat. 104 secured adjacent the first frame portion 14 first end, by means of a folding footrest 108, which is pivoted laterally across the opposite first and second side members 16 and 18 of the first frame portion 12. The foot rest 108 is normally in a retracted position to lie substantially coplanar with the remainder of the lateral members 32 of the first frame portion 12, and serve as a floor thereof. However, by extending the foot rest 108 to a raised position, as shown in broken lines in FIG. 3, the person climbing with the present stand may insert his/her feet through the resulting open area normally covered by the foot rest 108 to position them below the raised foot rest 108, and lift the first frame portion 12 by lifting his/her feet to lift the foot rest 108, adjacent lateral members 32, and the attached first frame portion 12, while remaining in a seated position on the seat 104.

When the present stand/carrier 10 has been deployed to the desired height in the tree T, the hunter H using the present stand/carrier 10 may have at his/her fingertips all of the articles desired to accompany that person on his/her hunt. Smaller articles may be secured within one or more optional containers 102, which may be secured to any number of convenient places on the stand/carrier 10, while larger articles may be tied or otherwise secured to the structure as desired. The seat 104 and attached back rest 106 may be removed from the climbing position at the first end 26 of the second frame portion 14, and transferred near the second end 30, with the back rest portion 106 positioned between the two diagonals 40/42, in order to enable the hunter to scan the surrounding area radiating from the side of the tree T to which the stand/carrier 10 is secured.

When the hunt is complete, the process is reversed, with the seat and back rest 104/106 removed from the second frame portion 14 second end 30 and secured to the first end 26. The hunter then lifts or extends the pivotally secured foot rest portion 108 to open the center of the first/lower frame portion 12 in order to provide access to the hunter's feet, and slightly lifts the upper portion 14 to loosen its grip on the tree T while standing on the lower frame portion 12 lateral members 32. The second/upper portion 14 is lowered to a new, lower position closer to the first/lower position 12, whereupon the hunter seats him/herself on the seat 104 and repositions the first/lower frame portion 12 to a lower location by initially lifting the first/lower frame portion 12 with his/her feet, and then allowing it to lower to a new position. This process is repeated as necessary until the hunter reaches the base of the tree T.

Once the ground has been reached, the hunter removes him/herself from the stand/carrier 10 and removes the two frame portions 12/14 from the tree T by removing one of the knobs 68 respectively securing one end of the upper blades 64 and 66 to the first and second frame portions 12 and 14. The blades 64 and 66 are then pivoted to open the space between the respective diagonal pairs 36/38 and 40/42, whereupon the two frame portions 12/14 may be withdrawn from about the tree T. The blades 64/66 are again secured across their respective diagonal pairs 36/38 and 40/42 (with the optional handle 72, shown in FIGS. 1 and 2, also secured across the ends 52 and 54 of the first frame portion 12 diagonals 36/38, as desired). The safety cable 100 may also be removed from its attachment point(s) to the first and/or second frame portions 12 and/or 14, as desired.

At this point, the first ends 24/26 respectively of the first and second frame portions 12/14 may be secured together by means of knobbed fasteners 68, with the first frame portion 12 first end 24 overlapping the second frame portion 14 first end 26, as shown in FIG. 1. The axle 86 may then be secured to the bottom of the second frame portion side members 20/22 by means of the internally threaded knobs 90, and the wheels 94 reinstalled on the ends of the axle 86 by means of a removable pin 96 at each wheel 94. The present stand/carrier 10 has now been reconfigured to the wheeled game carrier configuration, whereupon the hunter may easily transport the stand/carrier 10 back to his/her vehicle or other point, or to the site of any game felled during the hunt. The relatively large wheels 94 enable the present stand/carrier 10 to be transported easily over relatively rough and uneven terrain, without exhausting the hunter or user of the stand/carrier 10.

The present stand/carrier 10 will be seen to be capable of carrying virtually any game likely to be downed by a sportsman hunter using the present stand/carrier, by securing the game to the lateral members 32 of the first frame portion 12, and/or extending it over the second frame portion 14 and axle 86, whereby the weight of the game will be distributed substantially near the axle 86 for more favorable weight distribution. Again, this is advantageous for the user of the present stand/carrier 10, as no undue effort need be expended to support a high fraction of the weight of the stand/carrier 10, and/or any equipment and/or game carried thereon. Thus, even the elderly and/or somewhat infirm person may still take part in a hunt by means of the present stand/carrier, without endangering his/her health by overexertion; the energy expended while working with the present stand/carrier will be seen to be on the order of that expended while working with a conventional garden cart, and thus will be seen to be not excessively overtaxing.

Accordingly, the present combination tree stand and game carrier 10 provides convenience for hunters and for other persons who wish to enjoy the outdoors, e.g., wildlife photographers and the like. As the present stand/carrier 10 is capable of carrying and supporting a large amount of weight and bulk without overtaxing the user thereof, it will be seen that additional articles, such as camouflage, etc., may be carried to the selected site, if desired. Thus, the present stand/carrier serves to open the sport of hunting, as well as other outdoor pursuits, to virtually any mobile person who desires to engage in such pursuits.

It is to be understood that the present invention is not limited to the sole embodiment described above, but encompasses any and all embodiments within the scope of the following claims.

I claim:

1. A combination tree stand and game carrier, comprising:
    a first frame portion and a second frame portion, each quickly and easily assembled and disassembled from one another to form a tree stand configuration and a game carrier configuration;
    said first frame portion having a first end including attachment means to said second frame portion to form a game carrier configuration when said first frame portion and said second frame portion are rigidly attached together, and an opposite second end including a lower, proximal tree engaging blade and an upper, distal tree engaging blade removably secured to said first frame portion;
    said second frame portion having a first end including attachment means to said first frame portion to form a game carrier configuration when said first frame portion and said second frame portion are rigidly attached together, and an opposite second end including a lower, proximal tree engaging blade and an upper, distal tree engaging blade removably secured to said second frame portion, whereby;
    said first ends of said first frame portion and said second frame portion are assembled together to form a game carrier with the second ends of the first and second portions extending in opposite direction, and disassembled with said tree engaging blades of said first frame portion disposed about the tree and said second portion is placed above said first portion with said tree engaging blades of said second frame portion disposed about the tree, and a user of said combination tree stand and game carrier alternately lifts said first portion and said second portion to climb the tree.

2. The combination tree stand and game carrier of claim 1, wherein:
    said second frame portion includes a single axle disposed laterally thereacross, with said axle including opposite ends each having a wheel thereon.

3. The combination tree stand and game carrier of claim wherein:
    said axle is located nearer said second frame portion first end than to said second frame portion second end, thereby being positioned near the center of said combined tree stand and game carrier when said first frame portion and said second frame portion are assembled to form said game carrier configuration.

4. The combination tree stand and game carrier of claim 2, wherein:
    said axle is removably installable on said second frame portion, and said wheels are removably installable on said axle.

5. The combination tree stand and game carrier of claim 1, wherein:
    said first frame portion includes a plurality of lateral crossmembers, serving as a standing platform for a user thereof when said tree stand and game carrier is in said tree stand configuration, and further serving as a game and equipment support when said tree stand and game carrier is in said game carrier configuration.

6. The combination tree stand and game carrier of claim 5, wherein:
    at least some of said crossmembers are pivotally attached to said first frame portion on a lateral axis, and are upwardly foldable to provide a folding footrest.

7. The combination tree stand and game carrier of claim 1, wherein:
    said tree stand configuration includes at least one safety cable securing said first frame portion and said second frame portion together.

8. The combination tree stand and game carrier of claim 1, wherein:
    said second frame portion includes a guard rail installed thereon.

9. The combination tree stand and game carrier of claim wherein:
    said guard rail comprises a generally U-shaped padded bar having opposite spaced apart first and second ends, with said first and second ends being secured to said second frame portion.

10. The combination tree stand and game carrier of claim 1, including:
    storage means installed thereon.

11. The combination tree stand and game carrier of claim 1, including:
    a seat and back rest removably installed to said second frame portion.

12. The combination tree stand and game carrier of claim 11, wherein:

said seat and back rest are selectively installable at either said first end or said second end of said second frame portion, when said tree stand and game carrier is in said tree stand configuration.

13. A combination tree stand and game carrier, comprising:
  a first frame portion and a second frame portion, each quickly and easily assembleable and disassembleable from one another to form a tree stand configuration and a game carrier configuration;
  said first frame portion including opposite spaced apart parallel first and second side members, and further including a first end including attachment means to said second frame portion to form a game carrier configuration when said first frame portion and said second frame portion are rigidly attached together, and an opposite second end including a lower, proximal tree engaging blade extending between said first frame portion side members;
  said first frame portion further including opposite, spaced apart parallel first and second diagonal members extending upwardly respectively from said first and second side members, with said diagonal members having distal ends with an upper, distal tree engaging blade removably installed therebetween;
  said second frame portion including opposite spaced apart parallel first and second side members including a first end including attachment means to said first frame portion to form a game carrier configuration when said first frame portion and said second frame portion are rigidly attached together, and an opposite second end including a lower, proximal tree engaging blade extending between said second frame portion side members;
  said second frame portion further including opposite, spaced apart parallel first and second diagonal members extending upwardly respectively from said first and second side members, with said diagonal members having distal ends with an upper, distal tree engaging blade removably installed therebetween, whereby;
  said first ends of said first frame portion and said second frame portion are assembled together to form a game carrier with the second ends of the first and second portions extending in opposite direction, and disassembled with said tree engaging blades of said first frame portion disposed about the tree and said second portion is placed above said first portion with said tree engaging blades of said second frame portion disposed about the tree, and a user of said combination tree stand and game carrier alternately lifts said first portion and said second portion to climb the tree.

14. The combination tree stand and game carrier of claim 13, wherein:
  said second frame portion includes a single removably installable axle disposed laterally across said first and second side members and located nearer said second frame portion first end than to said second frame portion second end, thereby being positioned near the center of said combined tree stand and game carrier when said first frame portion and said second frame portion are assembled to form said game carrier configuration, with said axle including opposite ends each having a wheel removably installed thereon.

15. The combination tree stand and game carrier of claim 13, wherein:
  said first frame portion includes a plurality of lateral crossmembers, serving as a standing platform for a user thereof when said tree stand and game carrier is in said tree stand configuration, and further serving as a game and equipment support when said tree stand and game carrier is in said game carrier configuration.

16. The combination tree stand and game carrier of claim 15, wherein:
  at least some of said crossmembers are pivotally attached across said first frame portion on a lateral axis between said first and second side members, and are upwardly foldable to provide a folding footrest.

17. The combination tree stand and game carrier of claim 13, wherein:
  said tree stand configuration includes at least one safety cable securing said first frame portion and said second frame portion together.

18. The combination tree stand and game carrier of claim 13, wherein:
  said second frame portion includes a guard rail installed thereon, with said guard rail comprising a generally U-shaped padded bar having opposite spaced apart first and second ends, with said first and second ends being secured respectively to said first and second diagonal members of said second frame portion.

19. The combination tree stand and game carrier of claim 13, including:
  storage means installed thereon.

20. The combination tree stand and game carrier of claim 13, including:
  a seat and back rest removably installed laterally across said first and said second side members of said second frame portion, with said seat and back rest being selectively installable at either said first end or said second end of said second frame portion, when said tree stand and game carrier is in said tree stand configuration.

* * * * *